(12) United States Patent
Takayanagi

(10) Patent No.: US 7,748,635 B2
(45) Date of Patent: Jul. 6, 2010

(54) MOBILE COMMUNICATION TERMINAL AND PROGRAM THEREOF

(75) Inventor: Haruhisa Takayanagi, Hamura (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 86 days.

(21) Appl. No.: 11/724,427

(22) Filed: Mar. 15, 2007

(65) Prior Publication Data

US 2007/0228160 A1 Oct. 4, 2007

(30) Foreign Application Priority Data

Mar. 31, 2006 (JP) ............... 2006-096485

(51) Int. Cl.
*G06K 19/06* (2006.01)
(52) U.S. Cl. ................. 235/492; 235/379; 235/380; 340/10.1; 340/10.51
(58) Field of Classification Search .............. 235/379, 235/380, 492; 340/10.1, 10.51
See application file for complete search history.

(56) References Cited

U.S. PATENT DOCUMENTS

| 6,729,550 | B2 * | 5/2004 | Seita et al. ............. 235/492 |
| 7,073,722 | B2 * | 7/2006 | Sugitani ................. 235/492 |
| 7,464,865 | B2 * | 12/2008 | Brown et al. ............. 235/380 |
| 2003/0174839 | A1 * | 9/2003 | Yamagata et al. ........ 380/270 |
| 2004/0181629 | A1 * | 9/2004 | Higuchi ................... 711/115 |

FOREIGN PATENT DOCUMENTS

| JP | 2005-025306 | 1/2005 |
| JP | 2005-354550 | 12/2005 |
| JP | 2006-058970 | 3/2006 |

OTHER PUBLICATIONS

Office Action dated May 12, 2008 issued for the corresponding Japanese Application No. JP 2006-096485.

* cited by examiner

*Primary Examiner*—Michael G Lee
*Assistant Examiner*—Michael Andler
(74) *Attorney, Agent, or Firm*—Cohen Pontnai Lieberman & Pavane LLP

(57) ABSTRACT

In a cellular phone, a central control section generally locks a noncontact IC card function as an invalid state. When an ID of an external device to which the cellular phone approaches is already registered in a registration list, the central control section releases the lock to execute electronic payment processing. After that, the central control section locks the noncontact IC card function as the invalid state. Meanwhile, when the ID of the external device is not registered yet, in the case that a user instructs to release the lock, the central control section releases the lock to execute the electronic payment processing. When the external device is not registered yet, the ID of the external device is automatically registered in the registration list.

4 Claims, 15 Drawing Sheets

FIG. 3

REGISTRATION LIST

| ID |
|---|
| AAAAAA |
| BBBBBB |
| ...... |
| ...... |

FIG. 5

REGISTRATION CONDITIONS

| REGISTRATION CONDITIONS |
|---|
| USED 3 TIMES OR MORE IN THE LAST 1 WEEK |

FIG. 4

USAGE HISTORY

| ID | DATE AND HOUR OF USE |
|---|---|
| AAAAAA | 2006/10/10  10:10 |
| | 2006/10/09  09:09 |
| | 2006/10/08  08:08 |
| | 2006/10/07  07:07 |
| | 2006/10/06  06:06 |
| BBBBBB | 2006/10/10  10:20 |
| | 2006/10/09  09:19 |
| | 2006/10/08  08:18 |
| | 2006/10/07  07:17 |
| | 2006/10/06  06:16 |
| | 2006/10/05  06:15 |
| CCCCCC | 2006/10/22  22:22 |
| | 2006/10/11  11:11 |
| | 2006/10/10  00:00 |
| DDDDDD | 2006/10/10  10:00 |

FIG. 10

USAGE HISTORY

| ID | NUMBER OF USE |
|---|---|
| AAAAAA | 5 |
| BBBBBB | 6 |
| CCCCCC | 3 |
| DDDDDD | 1 |

FIG. 11

REGISTRATION CONDITIONS

| USED 3 TIMES OR MORE |
|---|

FIG. 12

REGISTRATION LIST

| ID | ACCESS CONDITIONS |
|---|---|
| AAAAAA | USABLE ONLY ON WEEK DAYS (MONDAY THROUGH FRIDAY) |
| BBBBBB | USABLE ONLY FROM 10:00 TO 18:00 |
| CCCCCC | NOT USABLE ON MONDAYS, WEDNESDAY, AND FRIDAYS |
| ...... | ...... |

FIG. 15

REGISTRATION LIST

| ID | LATEST DATE OF USE |
|---|---|
| AAAAAA | 2006/10/10 |
| BBBBBB | 2006/10/10 |
| ...... | ...... |
| ...... | ...... |

FIG. 16

DELETION CONDITIONS

| NO USE IN THE LAST 1 MONTH |
|---|

FIG. 18

USAGE HISTORY

| ID | DATE AND HOUR OF USE |
|---|---|
| AAAAAA | 2006/10/10 10:10 |
| | 2006/10/09 09:09 |
| | 2006/10/08 08:08 |
| | 2006/10/07 07:07 |
| | 2006/10/06 06:06 |
| BBBBBB | 2006/10/10 10:20 |
| | 2006/10/09 09:19 |
| | 2006/10/08 08:18 |
| | 2006/10/07 07:17 |
| | 2006/10/06 06:16 |
| | 2006/10/05 06:15 |
| ...... | ...... |
| | ...... |
| | ...... |
| ...... | ...... |

FIG. 19

DELETION CONDITIONS

| NUMBER OF USE IN THE LAST 48 HOURS IS LESS THAN 2 |
|---|

MOBILE COMMUNICATION TERMINAL AND PROGRAM THEREOF

CROSS-REFERENCE TO RELATED APPLICATION

This application is based upon and claims the benefit of priority from the prior Japanese Patent Application No. 2006-096485, filed 31 Mar. 2006, the entire contents of which is incorporated herein by reference.

BACKGROUND OF THE INVENTION

1. Field of the Invention

The present invention relates to a mobile communication terminal and a program thereof.

2. Description of the Related Art

In recent years, cellular phones mounted with a noncontact IC card function have become popular. In the noncontact IC card function, it is possible to realize transmitting and receiving information such as electronic money and personal authentication between the cellular phone and an external device (reader/writer). Thus, the cellular phone can be used as a substitute for a wallet or an ID card.

Accordingly, it becomes important to take preventive measures to avoid unauthorized use of the cellular phone by a third person. As one of the preventive measures, there is a function, so-called lock function that prohibits part or all of operations of the noncontact IC card function to prevent the unauthorized use by other people (for example, refer to Japanese Laid-Open Patent Publication No. 2005-354550).

It is often the case that in the lock function mounted on the cellular phone, a user presets a lock state (state in which processing operations of the electronic money, the personal authentication and the like are not executed automatically even when the cellular phone approaches the external device), and the user releases the lock by authentication operation such as inputting a password when the user uses the noncontact IC card function. The authentication operation is intended to prevent a third person from releasing the lock.

However, in the related arts, the operation to release the lock includes the authentication operation such as inputting the password. Therefore, every time the user uses the noncontact IC card function, the user needs to operate releasing the lock function, causing a greatly tangled duty for the user. Meanwhile, when the lock is always released to avoid such a tangled duty, it may cause the unauthorized use by a third person.

SUMMARY OF THE INVENTION

In accordance with an aspect of the present invention, there is provided a mobile communication terminal having a noncontact IC card function executing a given processing operation between the mobile communication terminal and an external device by noncontact communication when the mobile communication terminal approaches the external device including a memory means for storing identification information of the external device, a state setting means for setting the given processing operation to one of an invalid state incapable of automatic execution and a valid state capable of the automatic execution, a state determination means for determining whether the given processing operation state set by the state setting means is the invalid state or the valid state when the mobile communication terminal approaches the external device; an obtaining means for obtaining identification information of the external device, a usability determination means for determining whether the identification information of the external device obtained by the obtaining means is included in the identification information of the external device stored in the memory means when the given processing operation is determined as the invalid state by the state determination means, a control means for controlling setting the given processing operation to the valid state by the state setting means when the usability determination means determines that the identification information of the external device obtained by the obtaining means is included in the identification information of the external device stored in the memory means, and an execution means for executing the given processing operation between the mobile communication terminal and the external device when the given processing operation state set by the state setting means is the valid state.

The above and further novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a block diagram showing a structure of a registration list according to the first embodiment;

FIG. 4 is a block diagram showing a structure of a usage history according to the first embodiment;

FIG. 5 is a block diagram showing a structure of registration conditions according to the first embodiment;

FIG. 10 is a conceptual diagram showing a usage history according to a modified example of the first embodiment;

FIG. 11 is a conceptual diagram showing registration conditions according to the modified example of the first embodiment;

FIG. 12 is a conceptual diagram showing a registration list according to a second embodiment of the invention;

FIG. 15 is a conceptual diagram showing a registration list according to a third embodiment of the invention;

FIG. 16 is a conceptual diagram showing deletion conditions according to the third embodiment;

FIG. 18 is a conceptual diagram showing a usage history according to a modified example of the third embodiment; and FIG. 19 is a conceptual diagram showing deletion conditions according to the modified example of the third embodiment.

DETAILED DESCRIPTION OF THE PREFERRED EMBODIMENTS

The present invention will hereinafter be described in detail with reference to the preferred embodiments shown in the accompanying drawings.

A. First Embodiment

A-1. Structure of the First Embodiment

Figure 1:
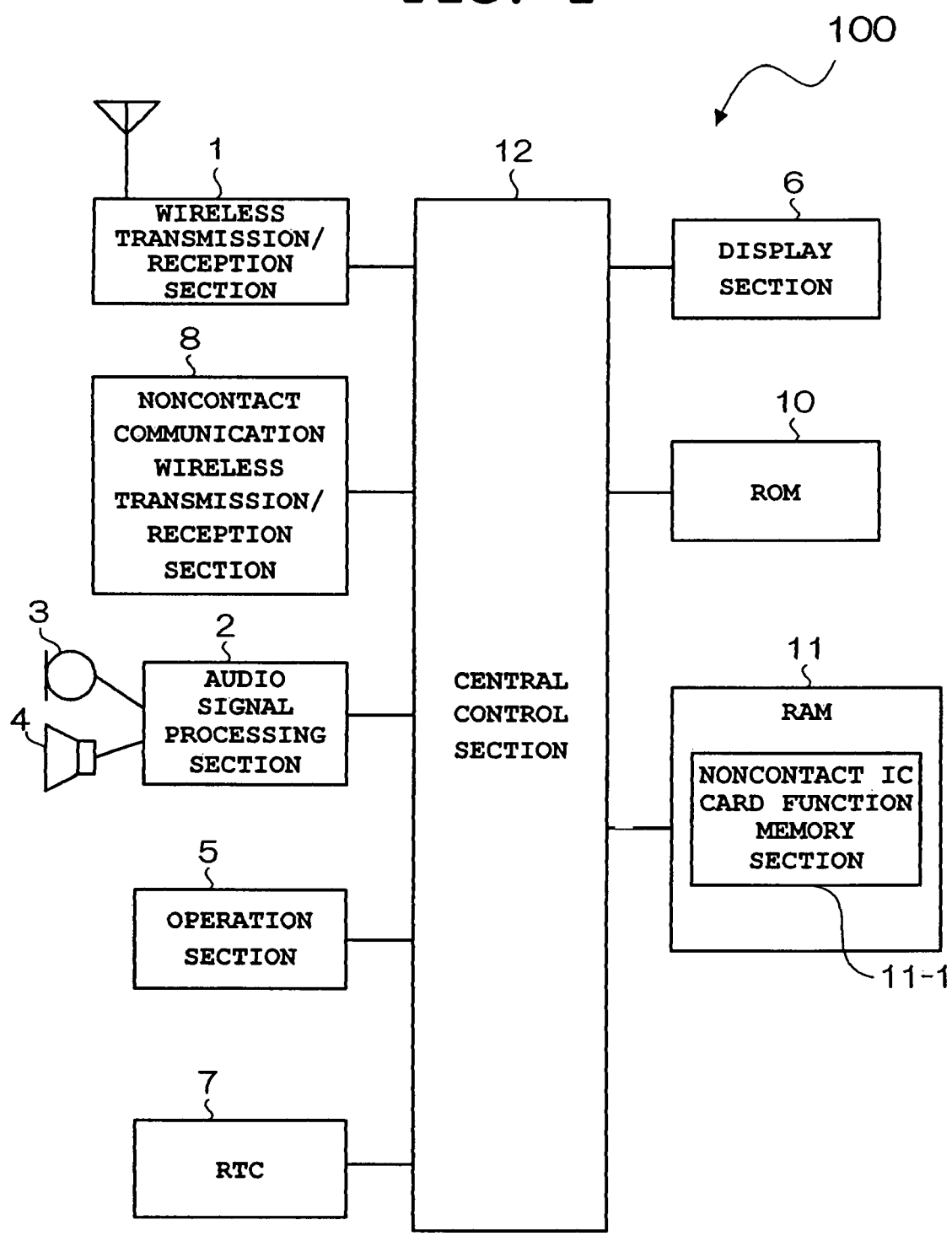
FIG. 1 is a block diagram showing a structure of a cellular phone according to a first embodiment of the invention.

FIG. 1 is a block diagram showing a structure of a cellular phone 100 (mobile communication terminal) according to the first embodiment of the invention. In the figure, a wireless transmission/reception section 1 performs telephone calls, data communication and the like via an unshown wireless base station. An audio signal processing section 2 captures sound from a microphone 3, converts the captured sound to a digital signal, and supplies the converted digital signal to a central control section 12. Further, the audio signal processing section 2 converts an audio signal to an analog signal, and outputs the converted analog signal from a speaker 4. An operation section 5 inputs telephone numbers, various data, operation instructions and the like. A display section 6 is composed of a liquid crystal display or the like. The display section 6 displays information such as an address book and telephone numbers, various setting screens and the like.

An RTC 7 counts a real time for obtaining date and hour. When a user carrying the cellular phone approaches an external device (reader/writer), a noncontact communication wireless transmission/reception section 8 transmits/receives information to or from the external device through noncontact wireless communication. A ROM 10 stores the foregoing given program, various parameters and the like. A RAM 11 stores various data. In particular, in this embodiment, the RAM 11 has a noncontact IC card function memory section 11-1.

Figure 2:
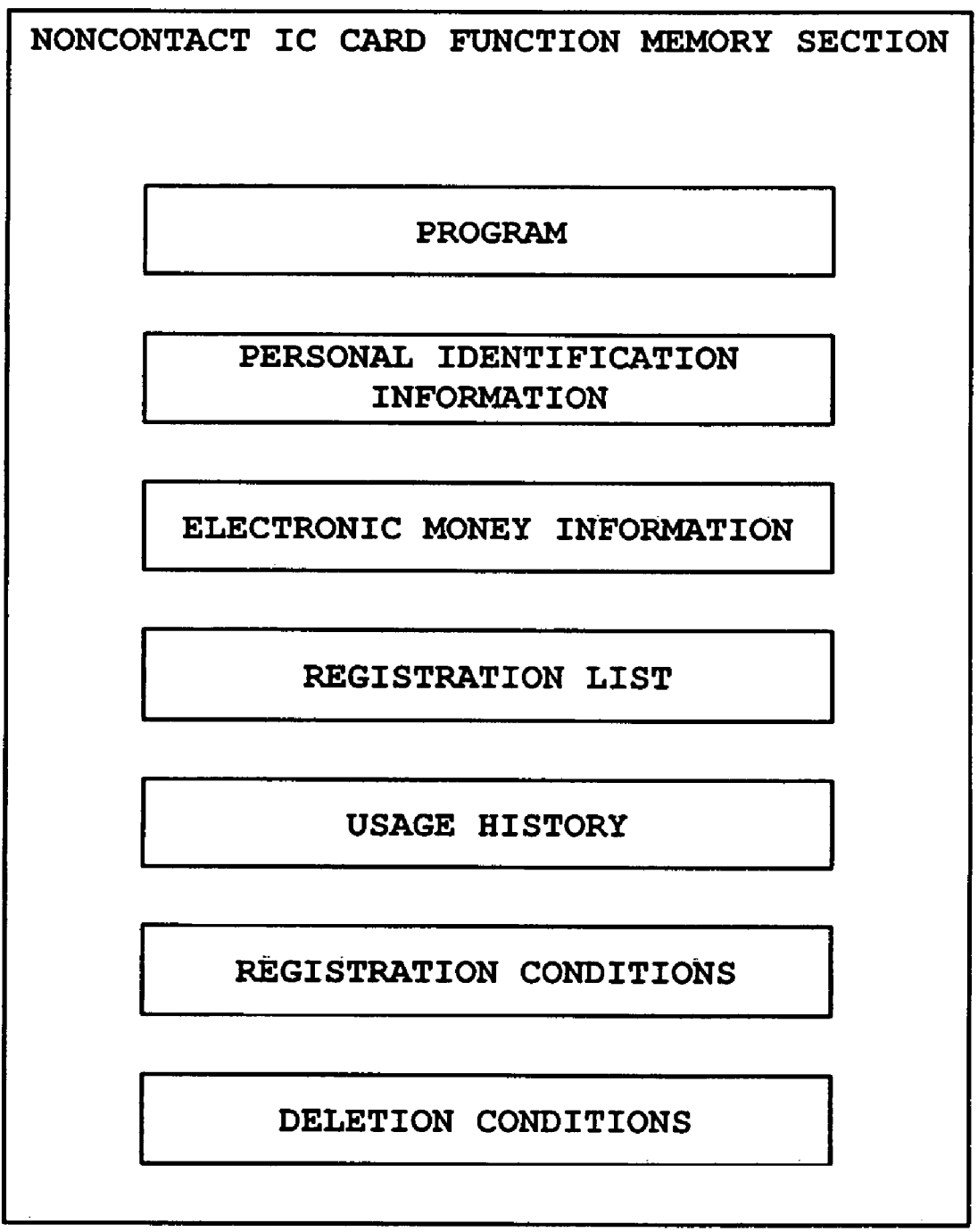
FIG. 2 is a block diagram showing a structure of a noncontact IC card function memory section according to the first embodiment.

As shown in FIG. 2, the noncontact IC card function memory section 11-1 (memory means, usage history memory means) retains a program, personal identification information, electronic money information, a registration list, a usage history, registration conditions, and deletion conditions. The program is used for the communication, processing of two-way authentication, and the electronic money and the like between the cellular phone and the external device. The personal identification information is identification information for authenticating an owner of the cellular phone (for the personal identification information, a description will be given in an after-mentioned second embodiment). The electronic money information is information indicating an outstanding amount or the like of the electronic money.

As shown in FIG. 3, the registration list is defined as a list of IDs (identification information) of external devices for which lock is automatically released (external devices to which the cellular phone operates as a noncontact IC card) when the cellular phone approaches thereto. As shown in FIG. 4, in the usage history, an ID of a used external device and an execution state of a given processing operation executed between the cellular phone and the used external device are stored. In this embodiment, as the execution state, date and hour of use of the external device is stored. As shown in FIG. 5, the registration conditions are defined as conditions under which IDs of external devices are registered in the registration list. In the example shown in the figure, the IDs of the external devices are registered in the case of "USED 3 TIMES OR MORE IN THE LAST 1 WEEK." The deletion conditions are defined as conditions under which the IDs of the external devices are deleted from the registration list on the contrary of the foregoing registration conditions (for the deletion conditions, a description will be given in an after-mentioned third embodiment).

The central control section 12 controls the respective sections according to a given program. In particular, in this embodiment, the central control section 12 switches from a valid state in which a given processing operation (electronic money payment processing, personal authentication processing and the like) is automatically executed when the cellular phone approaches the external device to an invalid state (lock state) in which the given processing operation is not executed when the cellular phone approaches the external device, and switches vice versa. Further, the central control section 12 determines whether or not the ID of the external device to which the cellular phone approached is registered in the registration list of the noncontact IC card function memory section 11-1. Furthermore, the central control section 12 executes the given processing operation when the cellular phone is in the foregoing valid state. In addition, the central control section 12 operates updating the usage history, newly registering and deleting the IDs of the external devices and the like.

The central control section 12 realizes functions of a state setting means, a state determination means, an obtaining means, a usability determination means, a control means, an execution means, and a registration means.

A-2. Operations of the First Embodiment

Next, operations of the foregoing first embodiment will be described.

As described as the related art, the noncontact IC card function of the cellular phone is in one of the following states according to user's operation. That is, the function is in a valid state (state in which a processing operation such as the electronic money and personal authentication is automatically executed when the cellular phone approaches the external device) or in the invalid state (lock state in which the processing operation such as the electronic money and the personal authentication is not executed when the cellular phone approaches the external device).

1. Main Routine

Figure 6:
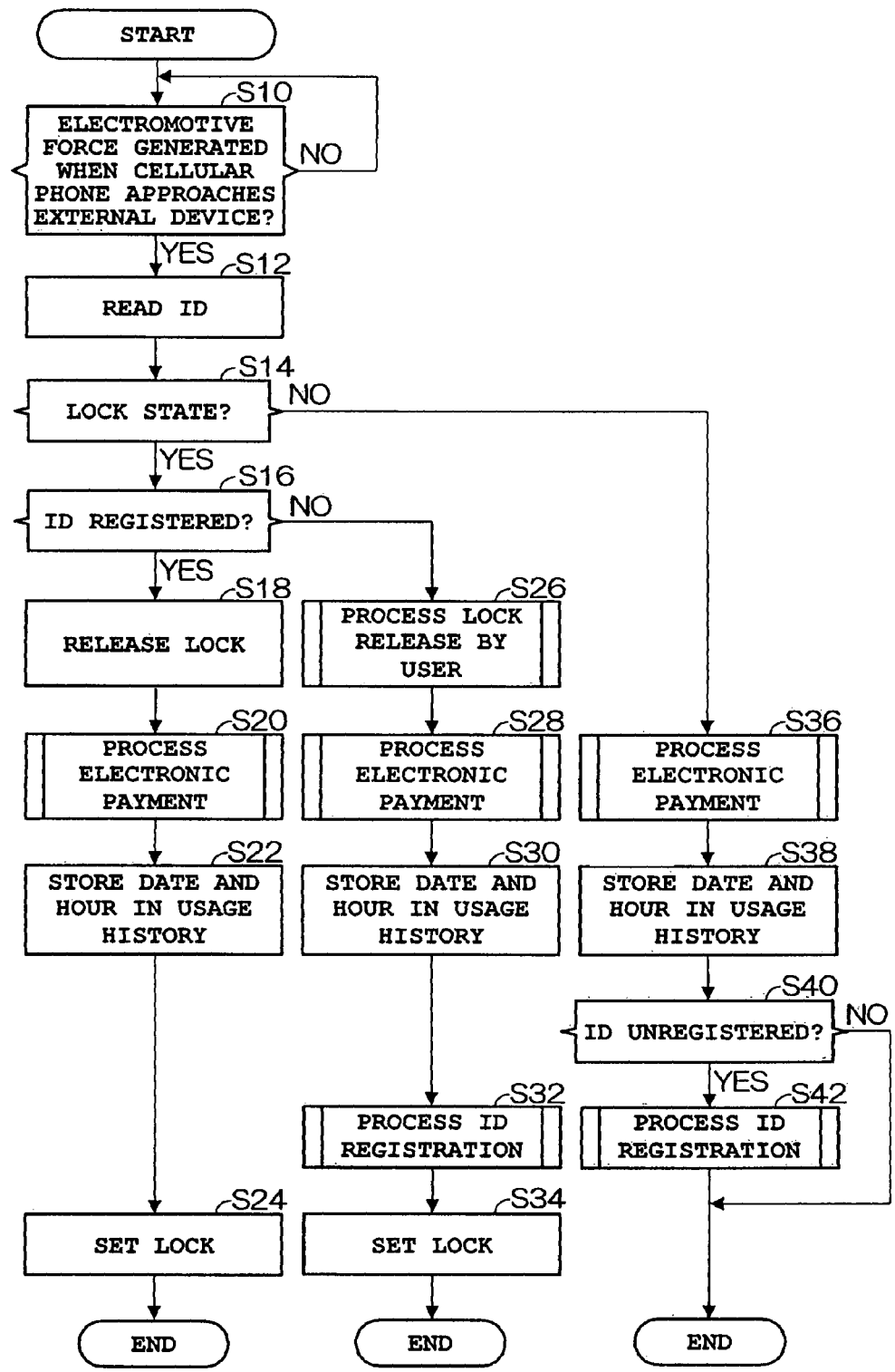
FIG. 6 is a flowchart for explaining operations of a main routine of the cellular phone according to the first embodiment.

FIG. 6 is a flowchart for explaining operations of a main routine of the cellular phone according to the first embodiment. First, determination is made whether or not an electromotive force is generated when the cellular phone approaches the external device (Step S10). When the electromotive force is generated when the cellular phone approaches the external device, the ID of the external device transmitted from the external device is read (Step S12). Next, determination is made whether or not the noncontact IC card function is in the lock state, that is, in the invalid state (Step S14).

When the noncontact IC card function is in the lock state, determination is made whether or not the ID of the external device is already registered in the registration list (Step S16). When the ID of the external device is already registered in the registration list, the lock is released (Step S18), electronic payment processing is executed between the cellular phone and the external device (Step S20), and the date and hour obtained from the RTC 7 is stored in the usage history in association with the ID of the external device (Step S22). For the details of the electronic payment processing, a description will be given later. After that, the lock is set to disable the noncontact IC card function, and the processing is ended (Step S24).

Meanwhile, when determination is made in Step S16 that the ID of the external device is not registered yet, lock release processing is made by the user (Step S26). Though described in details, in the lock release processing, an inquiry is made to the user whether or not the lock is to be released. Then, when an instruction to release the lock is issued by the user, the lock is released. When the user operates the lock release, the electronic payment processing is executed between the cellular phone and the external device (Step S28), and the date and hour obtained from the RTC 7 is stored in the usage history in association with the ID of the external device (Step S30).

Next, ID registration processing is made to register the ID of the used external device in the registration list (Step S32). The lock is set to disable the noncontact IC card function, and the processing is ended (Step S34).

When determination is made in Step S14 that the noncontact IC card function is not in the lock state, the electronic payment processing is directly executed between the cellular phone and the external device (Step S20), and the date and hour obtained from the RTC is stored in the usage history in association with the ID of the external device (Step S22). Next, determination is made whether or not the ID of the external device is unregistered in the registration list (Step S40). When the ID of the external device is unregistered in the registration list, the ID registration processing is made to register the ID of the external device in the registration list, and the processing is ended (Step S42).

2. Lock Release Processing by the User

Figure 7:
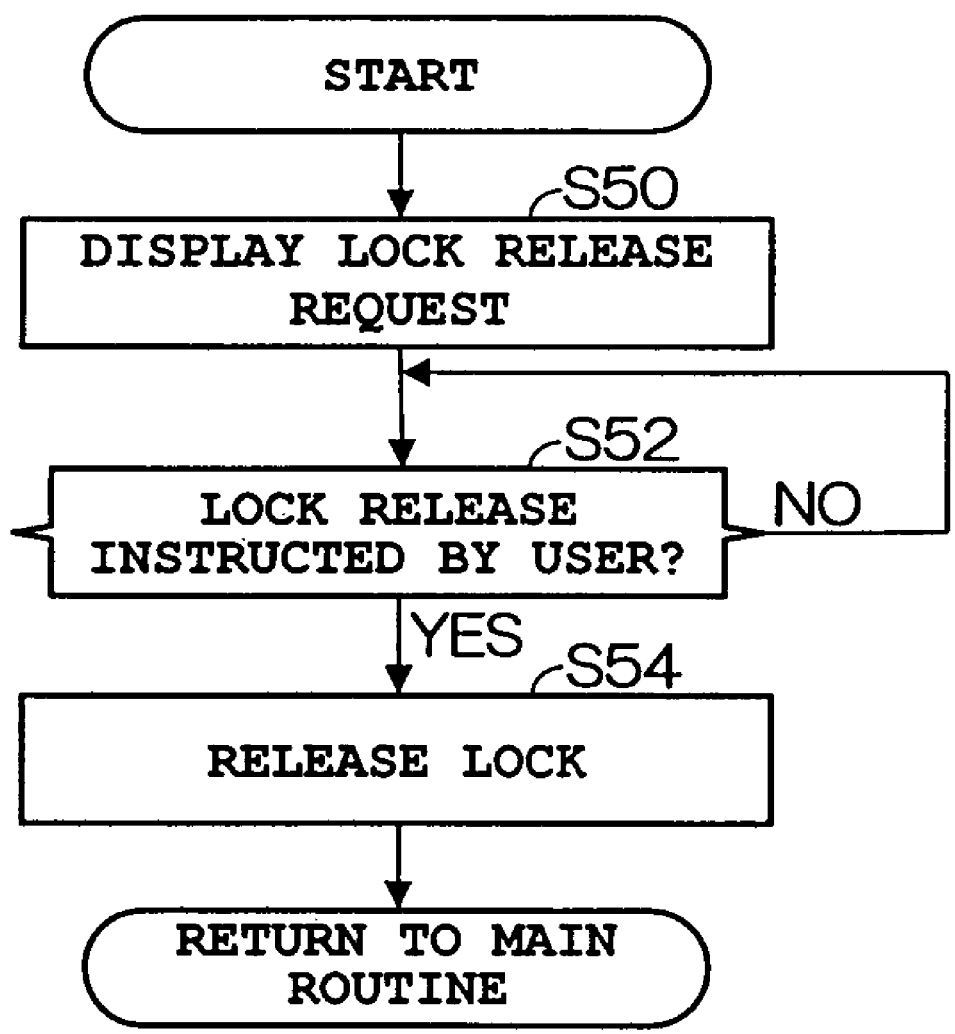
FIG. 7 is a flowchart for explaining lock release processing by a user according to the first embodiment.

Next, a description will be given of the foregoing lock release processing by the user. FIG. 7 is a flowchart for explaining the lock release processing by the user. In the lock release processing by the user, first, a lock release request is displayed on the display section 6 (Step S50), and determination is made whether or not a lock release instruction is issued by the user (Step S52). As described as the related art, the lock release instruction by the user includes the authentication such as inputting the password by user's operation. When the lock release instruction is issued, the lock is released to enable the noncontact IC card function (Step S54) to return to the foregoing main routine.

3. Electronic Payment Processing

Figure 8:
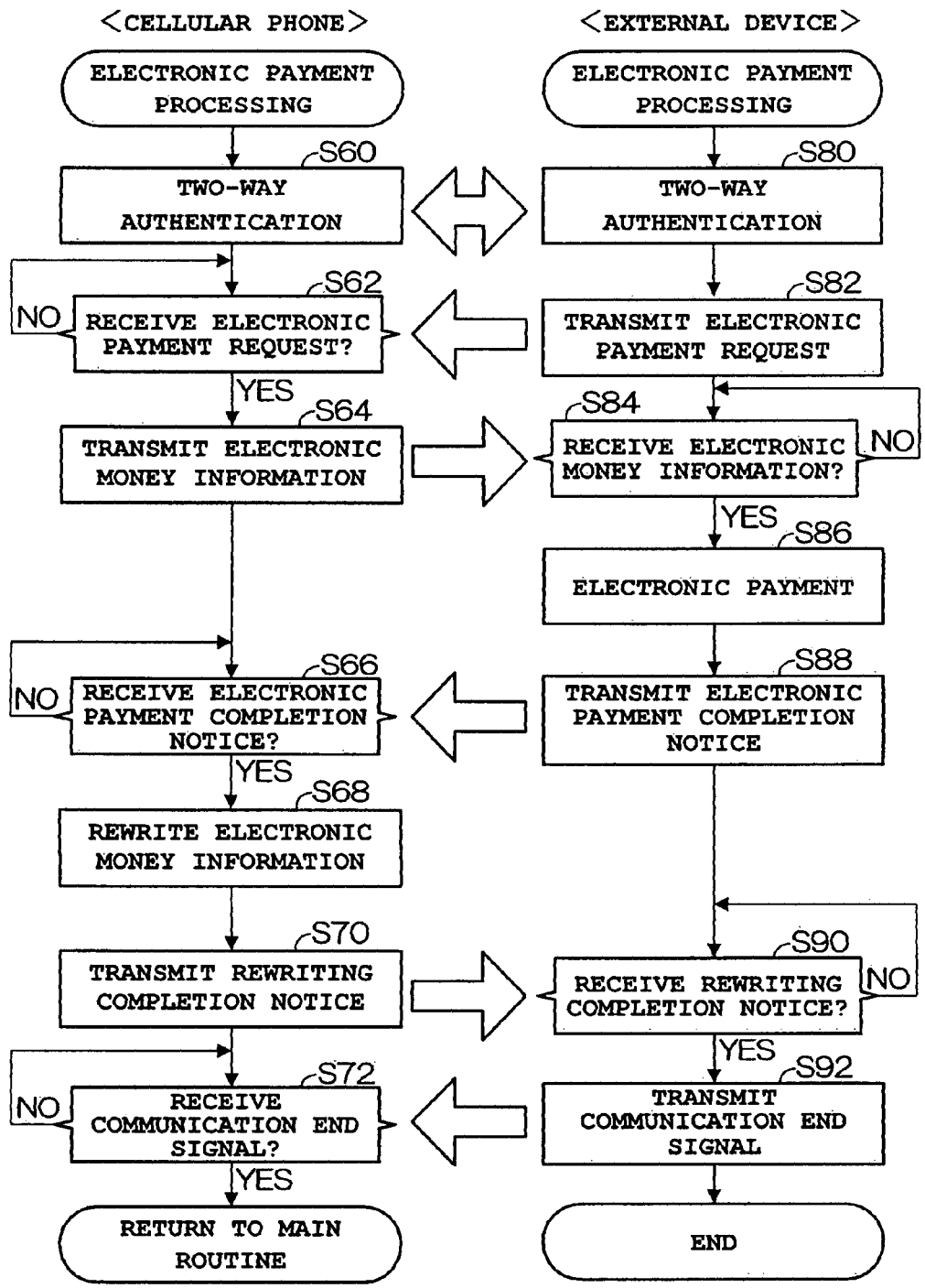
FIG. 8 is a flowchart for explaining electronic payment processing according to the first embodiment.

Next, a description will be given of the foregoing electronic payment processing. FIG. 8 is a flowchart for explaining the electronic payment processing. In the electronic payment processing, first, the two-way authentication is made between the cellular phone and the external device (Steps S60, S80). Next, the cellular phone determines whether or not the cellular phone receives an electronic payment request from the external device (Step S62). When the electronic payment request is transmitted from the external device (Step S82), the cellular phone transmits electronic money information (Step S64). After the external device transmits the electronic payment request, the external device determines whether or not the external device receives the electronic money information (Step S84). When the external device receives the foregoing electronic money information from the cellular phone, the electronic payment is made (Step S86).

When the electronic payment with electronic money is ended, the external device transmits an electronic payment completion notice (Step S88). After the cellular phone transmits the electronic money information, the cellular phone determines whether or not the cellular phone receives the electronic payment completion notice (Step S66). When the cellular phone receives the electronic payment completion notice from the external device, the cellular phone rewrites the electronic money information, for example, updates the outstanding amount (Step S68), and transmits a rewriting completion notice to the external device (Step S70).

After the external device transmits the electronic payment completion notice, the external device determines whether or not the external device receives the rewriting completion notice (Step S90). When the external device receives the rewriting completion notice from the cellular phone, the external device transmits a communication end signal (Step S92) to end the processing. After the cellular phone transmits the rewriting completion notice, the cellular phone determines whether or not the cellular phone receives the communication end signal (Step S72). When the cellular phone receives the foregoing communication end signal from the external device, the cellular phone returns to the foregoing main routine.

4. ID Registration Processing

Figure 9:
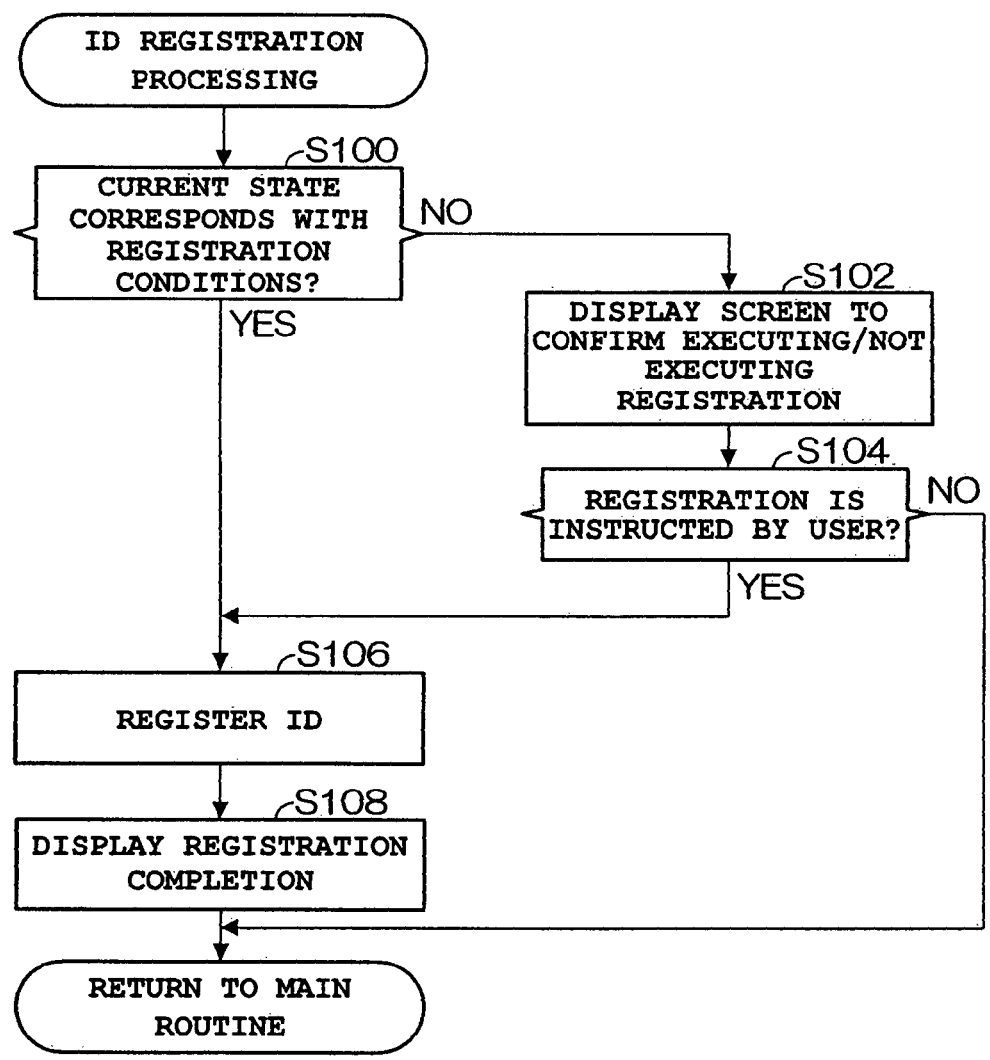
FIG. 9 is a flowchart for explaining ID registration processing according to the first embodiment.

Next, a description will be given of the foregoing ID registration processing. FIG. 9 is a flowchart for explaining the ID registration processing. In the ID registration processing, first, determination is made whether or not the current state corresponds with the registration conditions (Step S100). In the first embodiment, the registration conditions are "USED 3 TIMES OR MORE IN THE LAST 1 WEEK." Therefore, determination is made whether or not the cellular phone uses the current external device three times or more in the last 1 week with reference to the usage history. When the current state corresponds with the registration conditions, the ID of the external device is registered in the registration list (Step S106), registration completion is displayed on the display section 6 (Step S108) and returns to the foregoing main routine. Meanwhile, when the current state does not correspond with the registration conditions, a screen to confirm whether or not the ID of the external device is to be registered in the registration list is displayed on the display section 6 (Step S102), and detection is made whether or not a registration is instructed by the user (Step S104). When the registration is instructed by the user, the procedure goes on to Step S106 to register the ID of the external device in the registration list. When the registration is not instructed by the user, the ID of the external device is not registered in the registration list and returns to the foregoing main routine.

B. Modified Example of the First Embodiment

Next, a description will be given of a modified example of the foregoing first embodiment. FIG. 10 is a conceptual diagram showing a usage history according to the modified example of the first embodiment. FIG. 11 is a conceptual diagram showing its registration conditions. In the modified example of the first embodiment, as the usage history, the number of use (sum total) of the external device is stored. The number of use that is updated every time the cellular phone uses the external device is the registration conditions, for example, "USED 3 TIMES OR MORE" as shown in FIG. 11.

According to the foregoing first embodiment and its modified example, as shown in the registration conditions, in a place frequently used by the user (three times or more in the last 1 week), for example, in a station ticket gate used for commuting to office or school, a store (cashier) or the like, the lock state is automatically released only when the cellular phone of the user approaches thereto. Therefore, the electronic money payment can be made without special operation such as inputting the password by the user.

Further, when the external device is not registered yet, the external device is to be registered. Therefore, when the external device is used after next time (from the using time onward), the lock state is automatically released only when the cellular phone of the user approaches thereto. In result, the electronic money payment can be made without special operation such as inputting the password by the user.

Furthermore, according to the foregoing first embodiment and its modified example, the conditions under which unregistered external devices are registered are limited to the case that the number of use of the external device exceeds a certain number, or exceeds a certain number in a certain period. Thereby, only the external device often used by the user can be easily registered. Therefore, it is possible to prevent registering an unregistered external device every time the user uses such an external device, and registering the external device not desired to be registered.

C. Second Embodiment

Next, a description will be given of a second embodiment of the invention. The structure of the cellular phone thereof is similar to that of FIG. 1, and thus the description thereof will be omitted. In the second embodiment, instead of the foregoing electronic money payment in the first embodiment, the personal authentication with no electronic money transaction is made. Specifically, the personal authentication is used when the user enters and leaves a given facility, a given company, a given department in the company or the like.

FIG. 12 is a conceptual diagram showing a registration list according to the second embodiment. In the second embodiment, as shown in the figure, as the registration list, access conditions for each external device are registered for every ID of each external device. The access conditions means conditions under which the external device is usable (or not usable). In the example of the figure, the external device with ID "AAAAAA" is accessible (usable) only on weekdays (Monday through Friday), the external device with ID "BBBBBB" is accessible only from 10:00 to 18:00, and the external device with ID "CCCCCC" is not accessible (not usable) on Mondays, Wednesdays, and Fridays.

In the second embodiment, the noncontact IC card function memory section 11-1 realizes a function of an access conditions memory means, and the central control section 12 realizes a function of an access conditions determination means.

C-1. Operations of the Second Embodiment

Next, operations of the second embodiment will be described.

1. Main Routine

Figure 13:
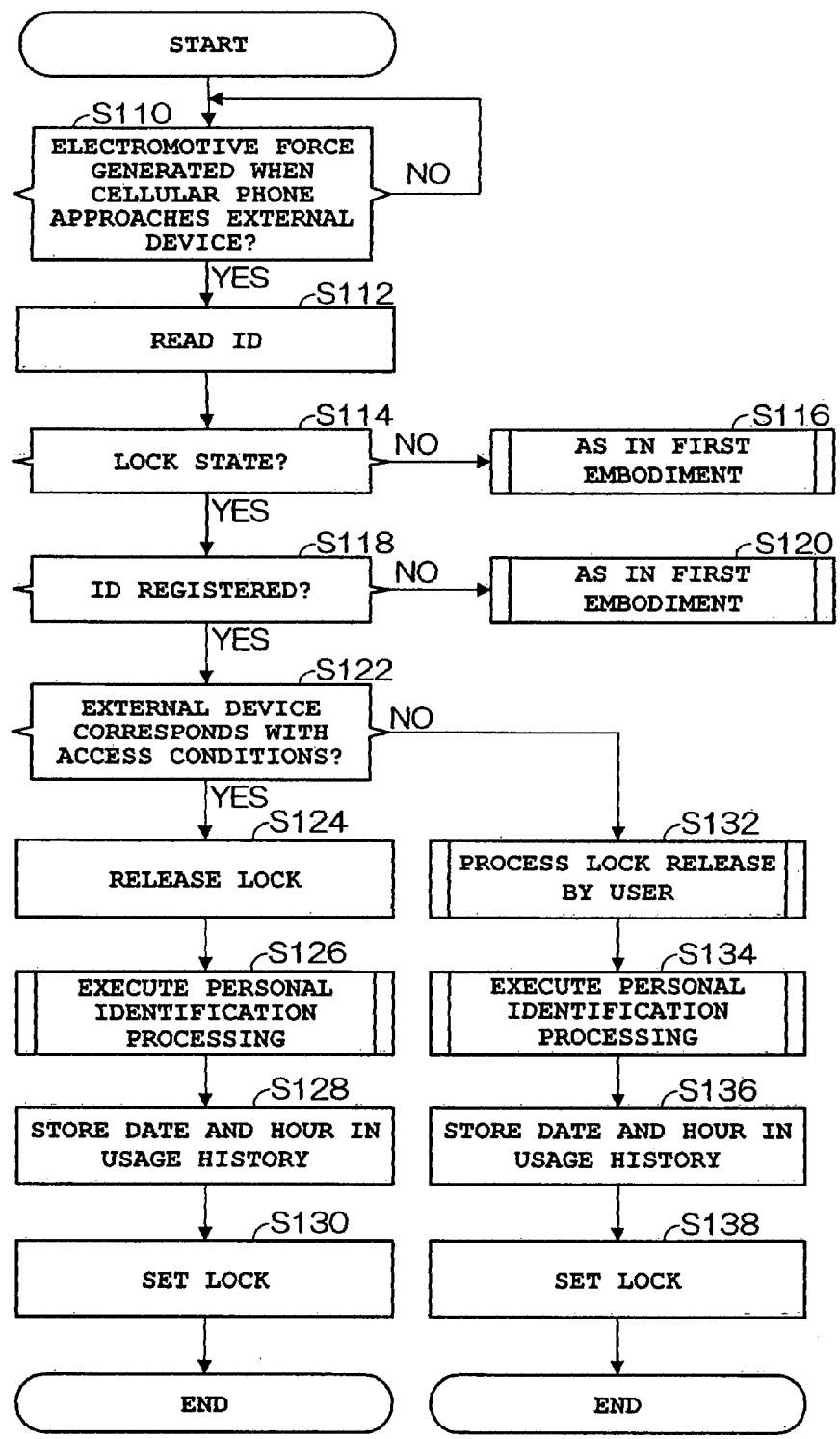
FIG. 13 is a flowchart for explaining a main routine of a cellular phone according to the second embodiment.

FIG. 13 is a flowchart for explaining operations of a main routine of the cellular phone according to the second embodiment. First, determination is made whether or not an electromotive force is generated when the cellular phone approaches the external device (Step S110). When the electromotive force is generated when the cellular phone approaches the external device, the ID of the external device transmitted from the external device is read (Step S112).

Next, determination is made whether or not the noncontact IC card function is in the lock state, that is, in the invalid state (Step S114). When the noncontact IC card function is not in the lock state, the personal authentication processing, the processing to store date and hour in the usage history, and the ID registration processing are executed in the same manner as in the foregoing first embodiment, except that the personal authentication processing is made instead of the electronic payment processing (Step S116).

Meanwhile, when the noncontact IC card function is in the lock state, that is, in the invalid state, determination is made whether or not the ID of the foregoing external device is already registered in the registration list (Step S118). When the ID of the external device is not registered yet in the registration list, the lock release processing by the user, the personal authentication processing, the processing to store date and hour in the usage history, the ID registration processing, and the lock setting are executed in the same manner as in the foregoing first embodiment, except that the personal authentication processing is made instead of the electronic payment processing (Step S120).

Meanwhile, when the ID of the foregoing external device is already registered in the registration list, determination is made whether or not the foregoing external device corresponds with the access conditions with reference to the registration list shown in FIG. 12 (Step S122). When the foregoing external device corresponds with the access conditions, the lock is released (Step S124), the personal identification processing is executed between the cellular phone and the external device (Step S126), and the date and hour obtained from the RTC is stored in the usage history in association with the ID of the external device (Step S128). For the details of the personal identification processing, the description will be given later. After that, the lock is set to disable the noncontact IC card function, and the processing is ended (Step S130).

Meanwhile, when the foregoing external device does not correspond with the access conditions, the lock release processing is made by the user as mentioned above (Step S132). When the user operates the lock release, the personal identification processing is executed between the cellular phone and the external device (Step S134), and the date and hour obtained from the RTC is stored in the usage history in association with the ID of the external device (Step S136). After that, the lock is set to disable the noncontact IC card function, and the processing is ended (Step S138).

2. Personal Identification Processing

Figure 14:
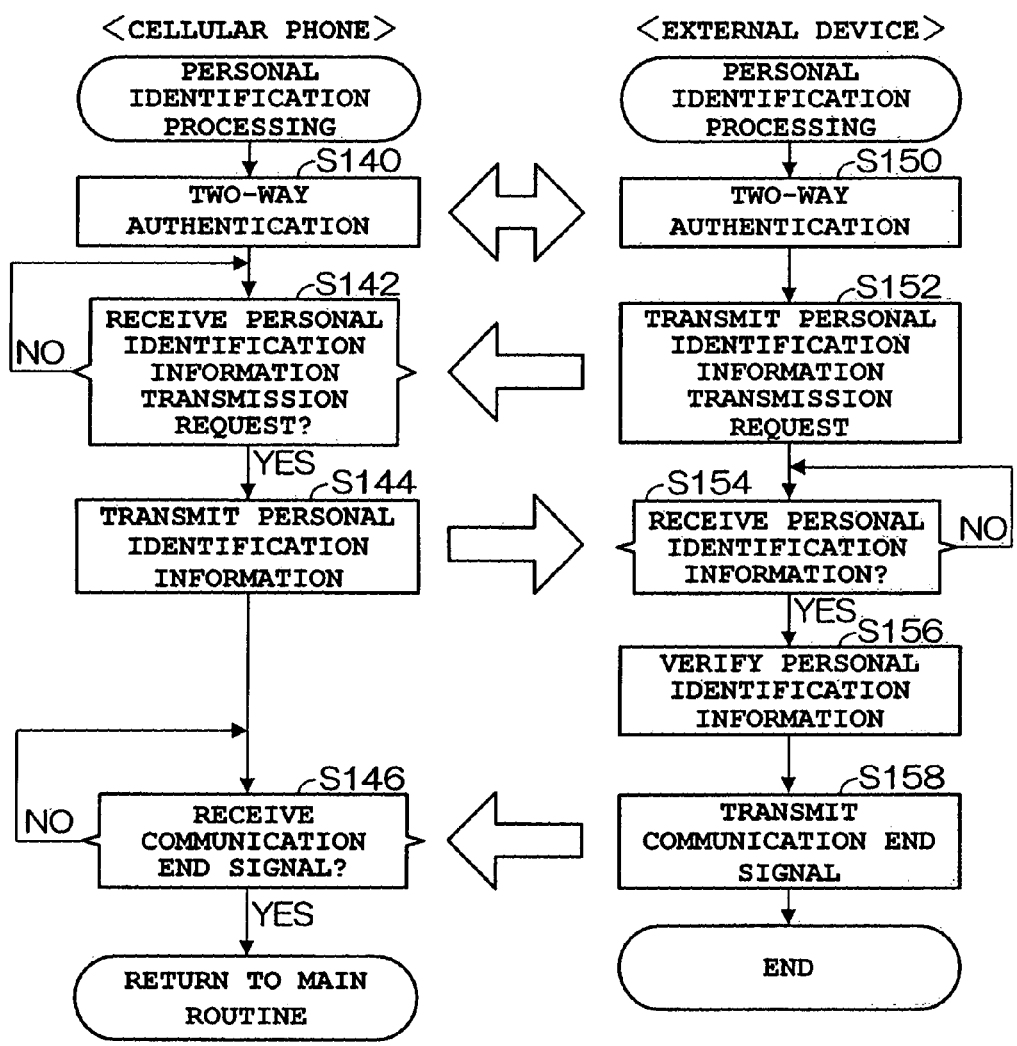
FIG. 14 is a flowchart for explaining personal identification processing according to the second embodiment.

Next, a description will be given of the foregoing personal identification processing. FIG. 14 is a flowchart for explaining the personal identification processing. In the personal identification processing, first, the two-way authentication is made between the cellular phone and the external device (Steps S140, S150). Next, the cellular phone determines whether or not the cellular phone receives a personal identification information transmission request from the external device (Step S142). When the personal identification information transmission request is transmitted from the external device (Step S152), the cellular phone transmits personal identification information (Step S144). After the external device transmits the personal identification information transmission request, the external device determines whether or not the external device receives the personal identification information (Step S154). When the external device receives the foregoing personal identification information from the cellular phone, the external device verifies the personal identification information (Step S156).

After ending verification of the personal identification information, the external device transmits a communication end signal (Step S158) to end the processing. After the cellular phone transmits the personal identification information, the cellular phone determines whether or not the cellular phone receives the communication end signal (Step S146). When the cellular phone receives the foregoing communication end signal from the external device, the cellular phone returns to the main routine.

According to the foregoing second embodiment, the lock state is released based on the access conditions when the cellular phone approaches the external device. Therefore, it is possible to prevent unauthorized use by a third person under the conditions other than the user's intended conditions.

D. Third Embodiment

Next, a description will be given of a third embodiment of the invention. The structure of the cellular phone thereof is similar to that of FIG. 1, and thus the description thereof will be omitted. FIG. 15 is a conceptual diagram showing a registration list according to the third embodiment. In the third embodiment, as shown in the figure, as the registration list, the latest date of use is registered as an execution state of a given processing operation executed between the cellular phone and each external device for every ID of each external device. In the example of the figure, for the external device with ID "AAAAAA" and the external device with ID "BBBBBB," as the latest date of use, "2006/10/10" is registered.

FIG. 16 is a conceptual diagram showing deletion conditions according to the third embodiment. In the third embodiment, as shown in the figure, the conditions under an ID of an external device is deleted from the registration list are registered as the deletion conditions. In the example of the figure, the deletion conditions are "NO USE IN THE LAST 1 MONTH." In the third embodiment, when an execution state of a given processing operation executed between the cellular phone and an external device corresponds with the deletion conditions, the ID of the external device is deleted from the registration list. Thereby, an ID of an external device that is not often used by the user can be automatically deleted, and unauthorized use can be prevented.

D-1. Operations of the Third Embodiment

Figure 17:
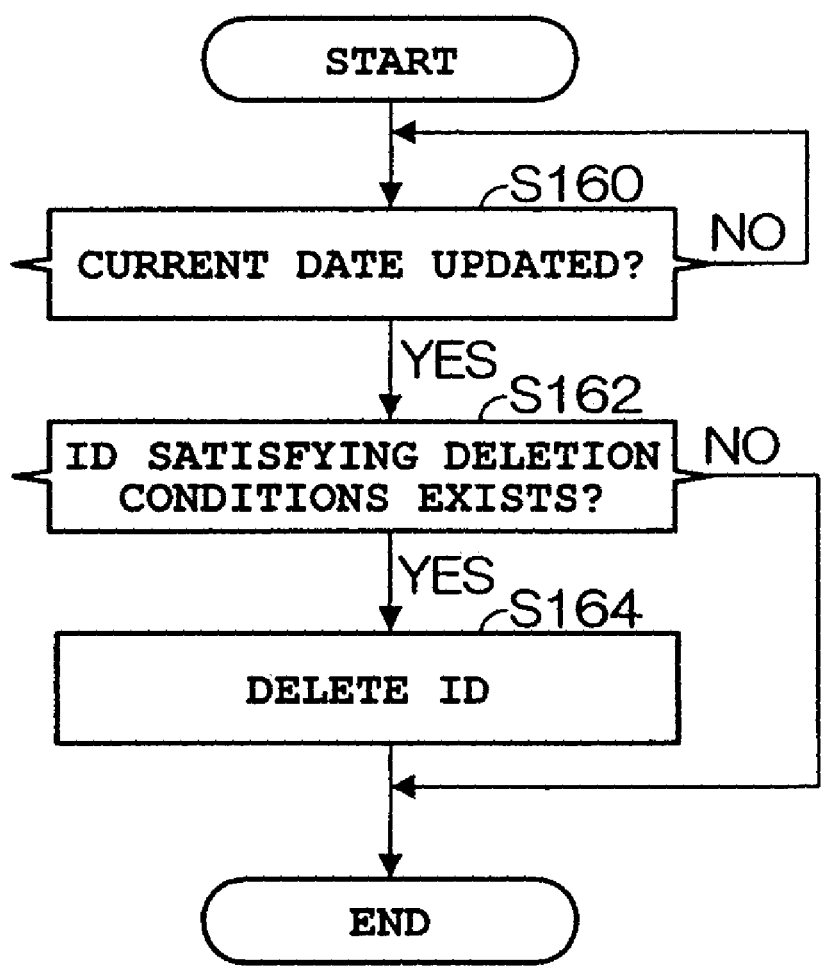
FIG. 17 is a flowchart for explaining deletion processing according to the third embodiment.

Next, operations of the third embodiment will be described. A description will be hereinafter given only of the deletion processing that characterizes the third embodiment. FIG. 17 is a flowchart for explaining the deletion processing according to the third embodiment. In the deletion processing, first, determination is made whether or not the current date is updated (Step S160). When the current date is updated, determination is made whether or not the ID satisfying the deletion conditions exists with reference to the registration list (Step S162). When the ID satisfying the deletion conditions does not exist, no operation is made to end the processing. Meanwhile, when the ID satisfying the deletion conditions exists, such an ID (information of the external device) is deleted from the registration list (Step S164) to end the processing.

E. Modified Example of the Third Embodiment

Next, a description will be given of a modified example of the foregoing third embodiment. FIG. 18 is a conceptual diagram showing a usage history according to the modified example of the third embodiment. FIG. 19 is a conceptual diagram showing deletion conditions. In the usage history in the modified example of the third embodiment, an ID of an external device used and an execution state of a given processing operation executed between the cellular phone and the external device are stored. As the execution state, the date and hour of use of the external device is stored. As shown in FIG. 19, the deletion conditions are "NUMBER OF USE IN THE LAST 48 HOURS IS LESS THAN 2." In the modified example of the third embodiment, when the execution state of the given processing operation executed between the cellular phone and the external device corresponds with the deletion conditions, the ID of the external device is deleted from the registration list. Thereby, an ID of an external device that is not often used by the user can be automatically deleted in units of time, and unauthorized use can be prevented.

In the modified example of the third embodiment, the central control section 12 realizes a function of a deletion means.

According to the foregoing third embodiment and its modified example, the external device that has not been used for a certain period is deleted from the pre-registered external device list. Therefore, an external device that is not often used by the user is not left as a registration target for a long time, and thus unauthorized use by a third person can be prevented.

In the foregoing embodiments, the ID of the external device is obtained based on the generation of electromotive force when the cellular phone approaches the external device. However, the ID of the external device can be obtained previously. For example, in the case that the ID of the external device such as a register set in a shop is transmitted toward inside the shop by short distance radio transmission, it is possible that when a user carrying a cellular phone enters the shop, the cellular phone receives the transmitted ID of the external device by short distance radio transmission.

Further, the lock state before noncontact communication may be set by user operation or may be previously set as the initial setting of the cellular phone.

Furthermore, although the computer program product of the mobile communication terminal which is a preferred embodiment of the present invention is stored in the memory (for example, ROM, etc.) of the mobile communication terminal, this processing program is stored on a computer-readable medium and should also be protected in the case of manufacturing, selling, etc. of only the program. In that case, the method of protecting the program with a patent will be realized by the form of the computer-readable medium on which the computer program product is stored.

While the present invention has been described with reference to the preferred embodiments, it is intended that the invention be not limited by any of the details of the description therein but includes all the embodiments which fall within the scope of the appended claims.

What is claimed is:

1. A mobile communication terminal having a noncontact IC card function automatically executing a given processing operation between the mobile communication terminal and an external device by noncontact communication when the mobile communication terminal approaches the external device, the mobile communication terminal comprising:

a memory means storing identification information that identifies a particular external device;

a state setting means for setting the given processing operation to one of an invalid state incapable of automatic execution and a valid state capable of the automatic execution;

a state determination means for determining whether the given processing operation state set by the state setting means is the invalid state or the valid state when the mobile communication terminal approaches the particular external device;

an obtaining means for obtaining identification information of the particular external device approached by the mobile communication terminal;

a usability determination means for determining whether the given processing operation should be set as the valid state without requiring user input of a password based on whether the identification information of the particular external device obtained by the obtaining means is included in the memory means when the given processing operation is determined as the invalid state by the state determination means;

a control means for controlling setting the given processing operation to the valid state by the state setting means without requiring user input of a password when the usability determination means determines that the identification information of the particular external device obtained by the obtaining means is in the memory means;

an execution means for automatically executing the given processing operation between the mobile communication terminal and the particular external device approached by the mobile communication terminal when the given processing operation state set by the state setting means is the valid state;

a registration means for registering the identification information of the particular external device obtained by the obtaining means in the memory means when the usability determination means determines that the identification information of the particular external device obtained by the obtaining means is not included in the memory means; and a usage history memory means for storing the identification information of the particular external device obtained by the obtaining means and an execution state of the given processing operation in association with each other when the given processing operation is executed between the mobile communication terminal and the particular external device approached by the mobile communication terminal by the execution means, wherein the registration means registers the identification information of the particular external device obtained by the obtaining means in the memory means when the execution state stored in the usage history memory means in association with the identification information of the particular external device obtained by the obtaining means satisfies given registration conditions.

2. The mobile communication terminal according to claim 1, further comprising:

an access conditions memory means for storing access conditions for the particular external device; and an access conditions determination means for determining whether or not the particular external device approached by the mobile communication terminal satisfies the access conditions stored in the access conditions memory means when approached by the mobile communication terminal, wherein, the control means controls the state setting means so as to set the given processing operation to the valid state when the usability determination means determines that the identification information of the external device obtained by the obtaining means is included in the memory means and when the access conditions determination means determines that the particular external device approached by the mobile communication terminal satisfies the access conditions.

3. The mobile communication terminal according to claim 1, further comprising:

deletion means for deleting the identification information of the particular external device from the memory means when the execution state of the given processing operation executed between the mobile communication terminal and the particular external device satisfies given deletion conditions.

4. A computer-readable medium having stored thereon a program executed by a processor in a mobile communication terminal having a noncontact IC card function automatically executing a given processing operation between the mobile communication terminal and an external device by noncontact communication when the mobile communication terminal approaches the external device comprising:

a memory processing step of storing identification information that identifies a particular external device;

a state setting processing step of setting the given processing operation to one of an invalid state incapable of automatic execution and a valid state capable of the automatic execution;

a state determination processing step of determining whether the given processing operation state set by the state setting processing is the invalid state or the valid state when the mobile communication terminal approaches the a particular external device;

an obtaining processing step of obtaining identification information of the particular external device approached by the mobile communication terminal;

a usability determination processing step of determining whether the given processing operation state should be set as the valid state without requiring user input of a password based on whether the identification information of the particular external device obtained by the obtaining processing is included in the stored identification information by the memory processing when the given processing operation is determined as the invalid state by the state determination processing;

a control processing step of controlling setting the given processing operation to the valid state by the state setting processing without requiring user input of a password when the usability determination processing determines that the identification information of the particular external device obtained by the obtaining processing is included in the stored identification information by the memory processing;

an execution processing step of automatically executing the given processing operation between the mobile communication terminal and the particular external device approached by the mobile communication terminal when the given processing operation state set by the state setting processing is the valid state;

a registration processing step of registering the identification information of the particular external device obtained by the obtaining processing step in the stored identification when the usability determination processing step determines that the identification information of the particular external device obtained by the obtaining processing step is not included in the stored identification information; and a usage history memory processing step of storing the identification information of the particular external device obtained by the obtaining processing step and an execution state of the given processing operation in association with each other when the given processing operation is executed between the mobile communication terminal and the particular external device approached by the mobile communication terminal by the execution processing step;

wherein the registration processing step registers the identification information of the particular external device obtained by the obtaining processing step in the stored identification information when the execution state stored by the usage history memory processing step in association with the identification information of the particular external device obtained by the obtaining processing step satisfies given registration conditions.

* * * * *